Oct. 2, 1934.  A. F. DILLON  1,975,450
CIGAR BANDING MACHINE
Filed Aug. 12, 1933   11 Sheets-Sheet 1

INVENTOR
Albert F. Dillon
BY
Cooper, Kerr & Dunham
ATTORNEYS

Oct. 2, 1934.   A. F. DILLON   1,975,450
CIGAR BANDING MACHINE
Filed Aug. 12, 1933   11 Sheets-Sheet 3

Oct. 2, 1934.                A. F. DILLON                1,975,450
                         CIGAR BANDING MACHINE
                   Filed Aug. 12, 1933        11 Sheets-Sheet 5

INVENTOR-
Albert F. Dillon
BY
Cooper, Kerr & Dunham
ATTORNEYS

Oct. 2, 1934.          A. F. DILLON          1,975,450
CIGAR BANDING MACHINE
Filed Aug. 12, 1933        11 Sheets-Sheet 6

FIG.9.

Oct. 2, 1934.  A. F. DILLON  1,975,450

CIGAR BANDING MACHINE

Filed Aug. 12, 1933  11 Sheets-Sheet 9

INVENTOR-
Albert F. Dillon
BY
Cooper, Kerr & Dunham
ATTORNEYS

Oct. 2, 1934.  A. F. DILLON  1,975,450
CIGAR BANDING MACHINE
Filed Aug. 12, 1933  11 Sheets-Sheet 10

INVENTOR
Albert F. Dillon
BY
Cooper, Kerr & Dunham
ATTORNEYS

Oct. 2, 1934.  A. F. DILLON  1,975,450
CIGAR BANDING MACHINE
Filed Aug. 12, 1933  11 Sheets-Sheet 11

UNITED STATES PATENT OFFICE 1,975,450

CIGAR BANDING MACHINE

Albert Flemming Dillon, Richmond, Va., assignor to P. Lorillard Company, New York, N. Y., a corporation of New Jersey Application August 12, 1933, Serial No. 684,860

50 Claims. (Cl. 131—61)

This invention covers improvements in machines for applying bands to cigars.

The object of the invention is to so improve the design and arrangement of the machine as to greatly enhance the convenience of operation and efficiency thereof.

To this and other ends the invention comprises the novel features and combinations of elements hereinafter described, and shown in the drawings, which by way of illustration show what I now consider to be the preferred form of the invention.

Figure 1:
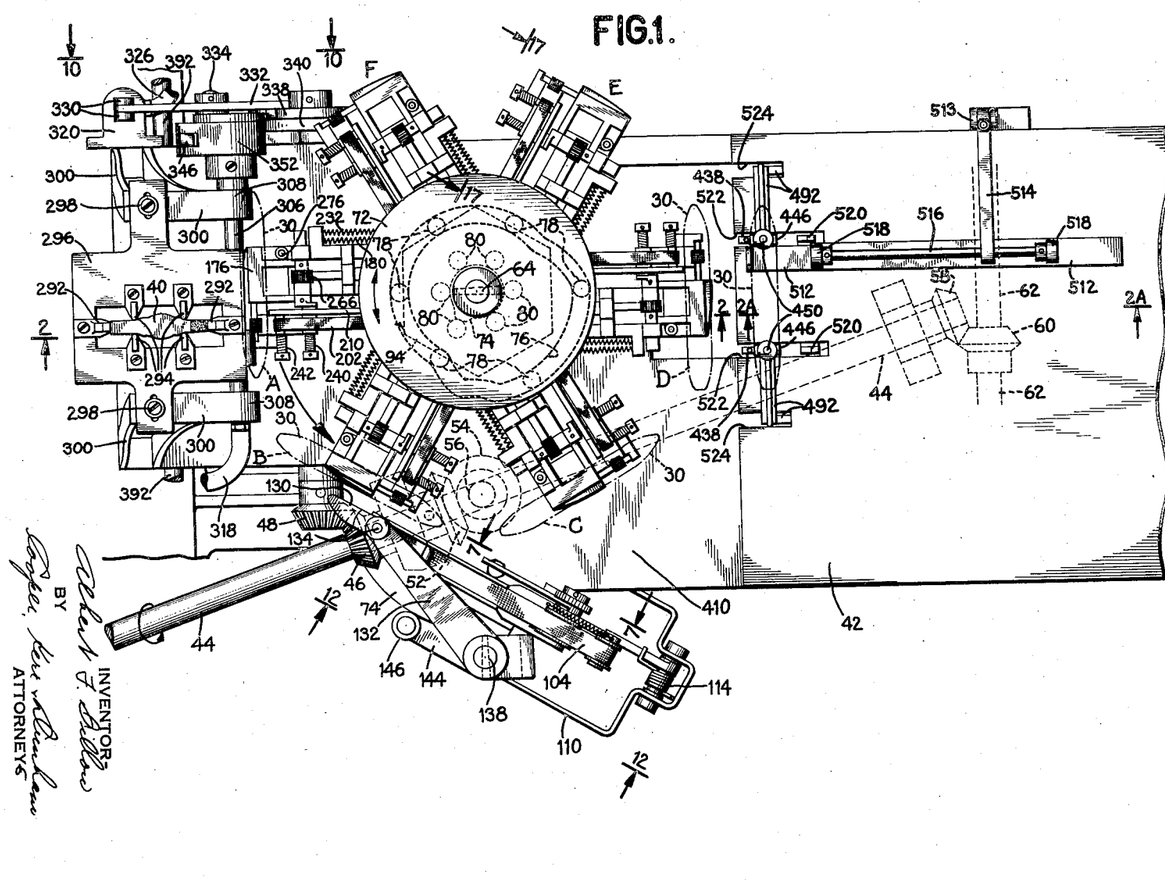
Figure 1 is a plan view of the machine.
Figure 2:
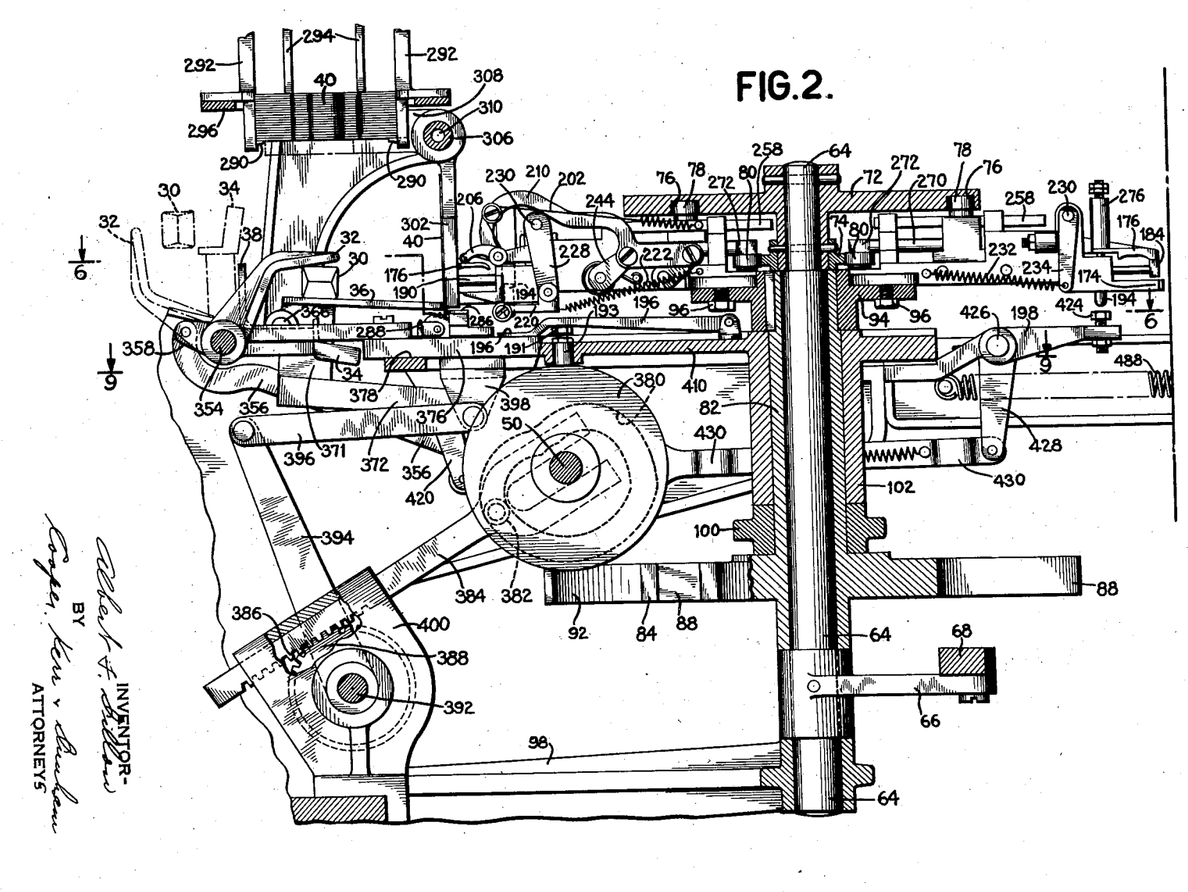
Figs. 2 and 2A are sectional views (enlarged) on lines 2—2 and 2A—2A, respectively, of Fig. 1.
Figures 22, 23, 24:
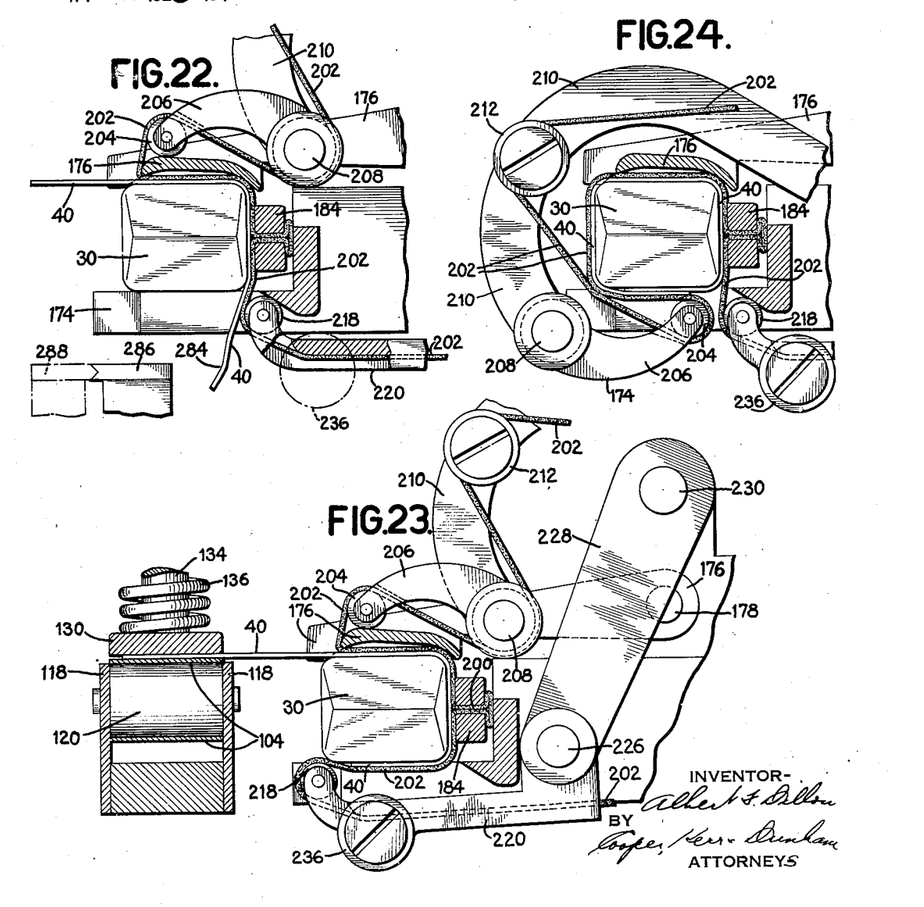
Fig. 22 is an enlarged detail on line 22—22 of Fig. 18 with a cigar in place and the band partly surrounding it.
Fig. 23 is an enlarged detail showing the short end of the band applied to the lower side of the cigar, and the longer end of the band projecting horizontally into the moistening device.
Fig. 24 shows the final step of wrapping the band around the cigar, with the applying devices still in place.

In the operation of this machine, the cigars 30 to be banded are delivered one at a time to the dotted line position at the left of Fig. 2, then are moved by fingers 32 and 34 onto elevator table 36, thence by deposit finger 38 into the jaws of one of the banding devices. In passing into the jaws of the banding device each cigar carries with it the band 40 to be applied to that particular cigar. When those steps of the operation are finished, the cigar and its band are in the bander as shown in Fig. 22, the cigar being at position "A" (Fig. 1).

Figures 2A, 4:
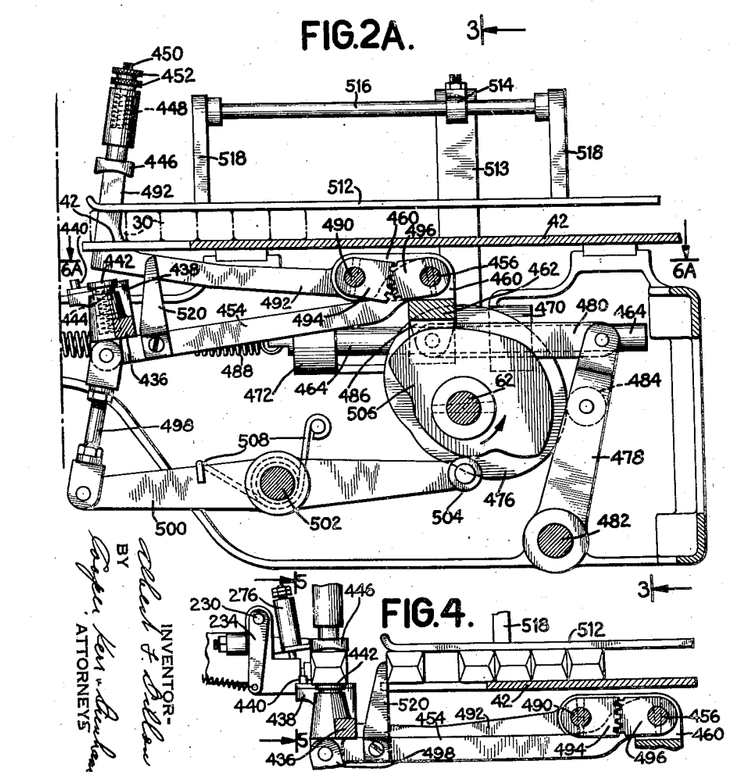
Fig. 4 is a fragmentary view of the mechanism of Fig. 2A just after it has received a banded cigar from the bander jaws at the right side of Fig. 2.

There are six of the banding devices mounted on a turret, which by a Geneva movement is moved counterclockwise in steps of 60 degrees each, the turret stopping at each station long enough for an operation to be performed. At station A a cigar is inserted into a banding device as explained. While passing from station A to station B the lower end of the band is placed up against the under side of the cigar. At station B the gummed side of the horizontally projecting band is moistened by belt 104 (Fig. 23), and the long end of the band is wrapped around the cigar with its moistened gummed end overlapping the shorter end of the band (Fig. 24), and the application of the band to the cigar is then complete. In order to give the moistened gum some time to set the parts are held as in Fig. 24 until the cigar reaches Station D, at which station the cigar is ejected from the device onto the delivery table 42 (Fig. 2A).

Figure 3:
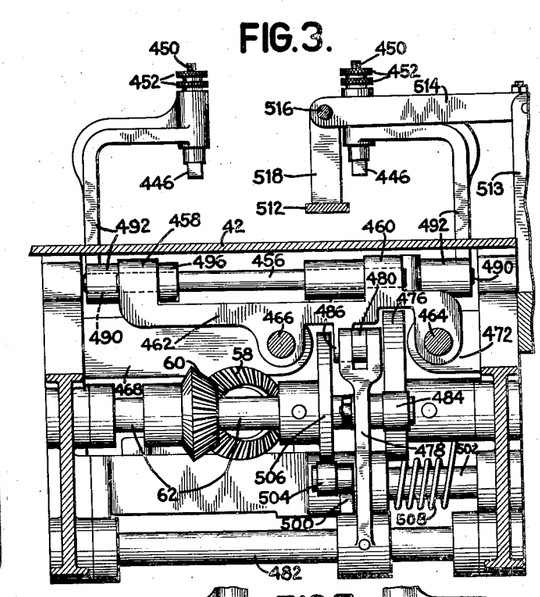
Fig. 3 is a sectional view on line 3—3 of Fig. 2A.
Figure 6:
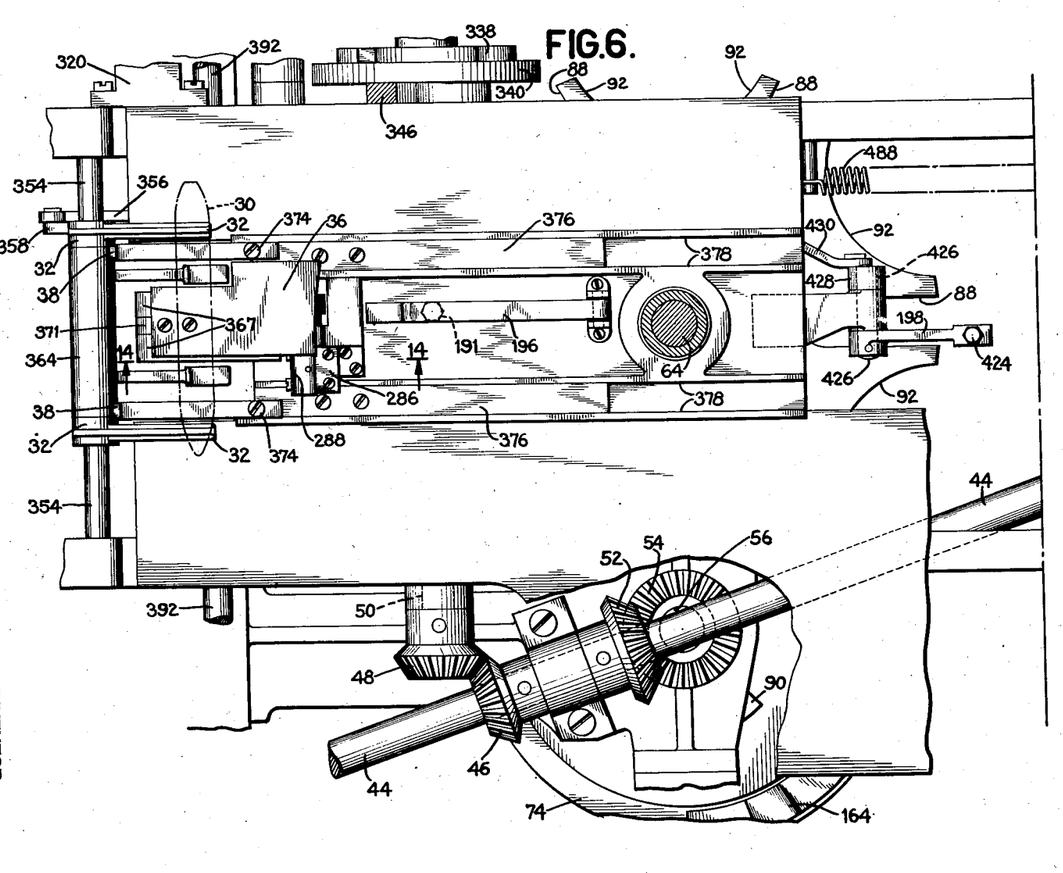
Figs. 6 and 6A are sectional views on lines 6—6 and 6A—6A of Figs. 2 and 2A, respectively.
Figure 6A:
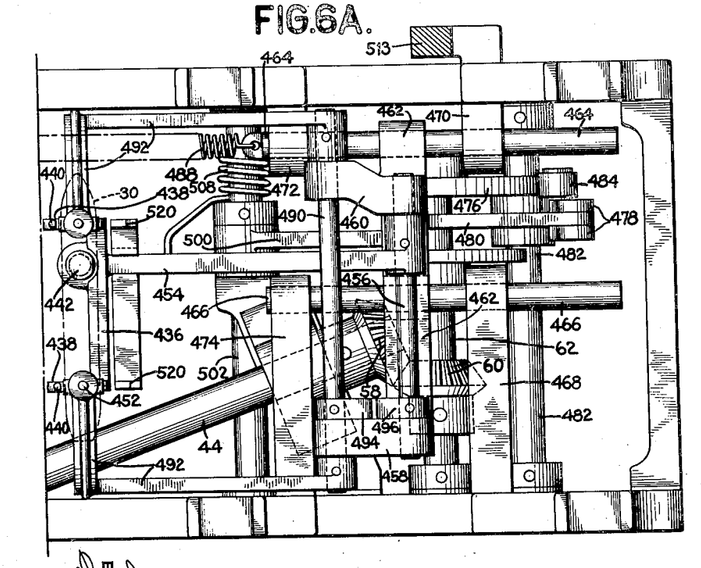
Figure 7:
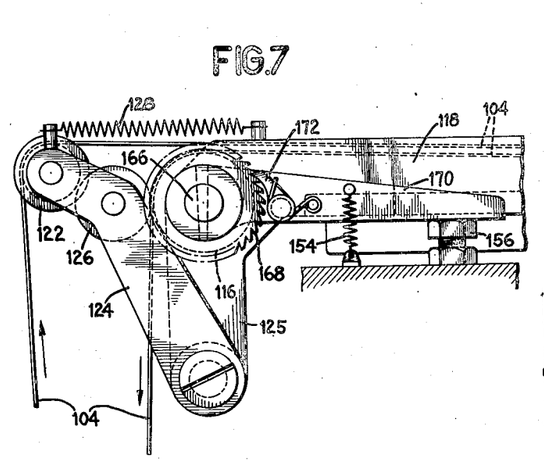
Fig. 7 is an enlarged detail of the moistening device, on line 7—7 of Fig. 1.
Figure 8:
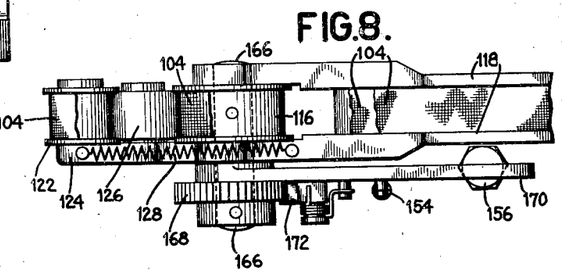
Fig. 8 is a plan view of Fig. 7.

The machine, as illustrated, receives the cigars from another machine which wraps each cigar in cellophane, and power for the present machine is received from the wrapping machine through shaft 44 (Figs. 1, 6, 6A and 9). This shaft, by pinions 46, 48, drives a horizontal cam shaft 50 crosswise of the machine; by pinions 52, 54, it drives vertical shafts 56 (Figs. 1 and 9) and by pinions 58, 60, it drives horizontal shaft 62 at the delivery end of the machine (Figs. 1, 3 and 6A).

On the center line of the machine opposite and parallel to shaft 56 is the vertical shaft 64 (Figs. 1, 2, 6, 9). Fast on this shaft near its lower end is an arm 66 (Figs. 2, 9) to the outer end of which is connected a link 68 having at its other end a cam roller 70 running in a cam groove 71 in horizontal disc 74, on shaft 56 (Fig. 9) to impart an oscillating movement to shaft 64. Fast on shaft 64 at its upper end are disc 72 and cam 74 (Figs. 1 and 2). Disc 72 has a cam groove 76 (Fig. 1) within which travel rollers 78, one on each banding device. Cam 74 has a single hump which at the proper time actuates each of the rollers 80, one on each banding device.

Figure 9:
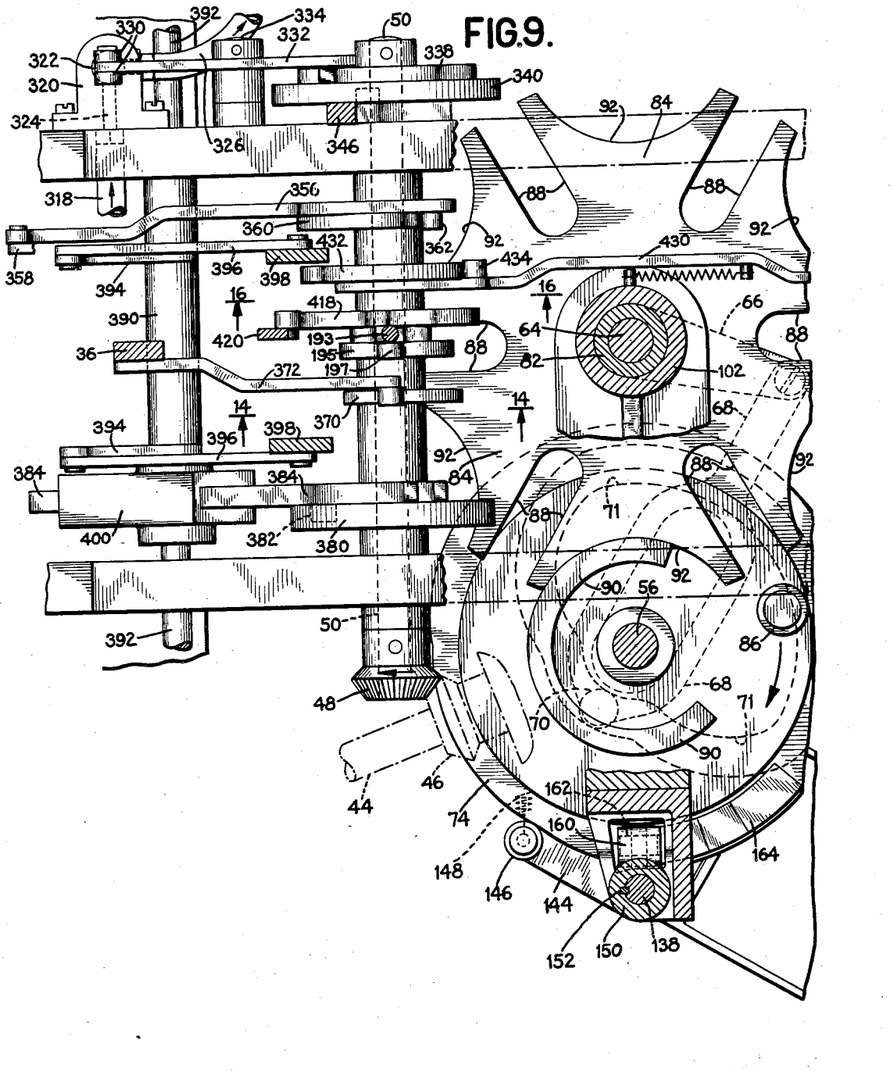
Fig. 9 is a section on line 9—9 of Fig. 2.

Surrounding shaft 64 and free to rotate thereon is a sleeve 82 (Figs. 2 and 9). Near the bottom of sleeve 82 and integral therewith is the slotted disc 84 which forms the driven member of the Geneva movement. The disc is moved intermittently through arcs of 60 degrees by roller 86 on cam disc 74 entering slots 88 in the Geneva disc. As is usual in devices of this kind, an interrupted ring 90 on disc 74 engages an arcuate surface 92 on disc 84 to hold disc 84 immovable while it is not under control of roller 86. At the upper end of sleeve 82 is keyed the turret 94 (Fig. 2) to which are secured (by bolts 96) the six radially projecting band applying devices (Fig. 1). In Fig. 2, parts designated 98, 100 and 102 are portions of the frame of the machine.

Moistening device

Figure 12:
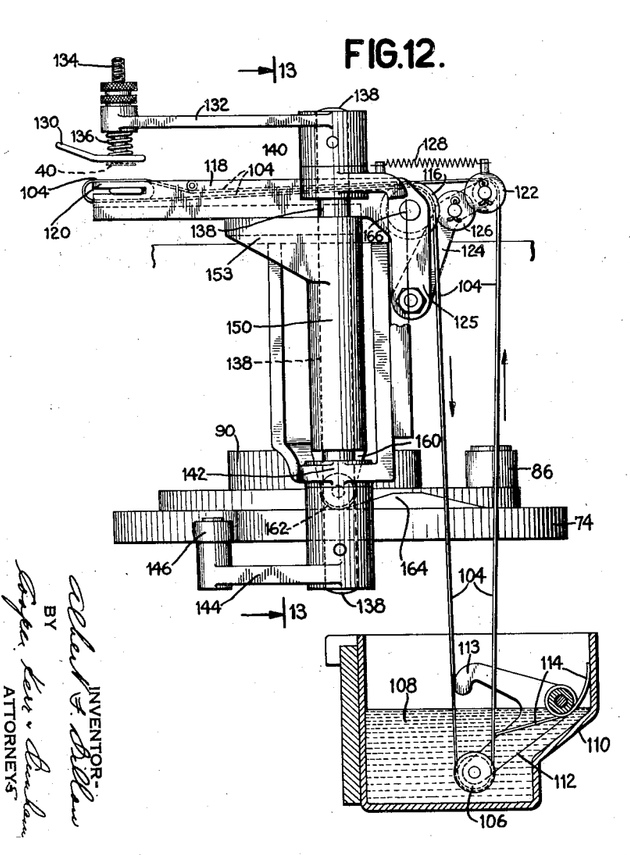
Fig. 12 is an enlarged detail view on line 12—12 of Fig. 1.
Figure 13:
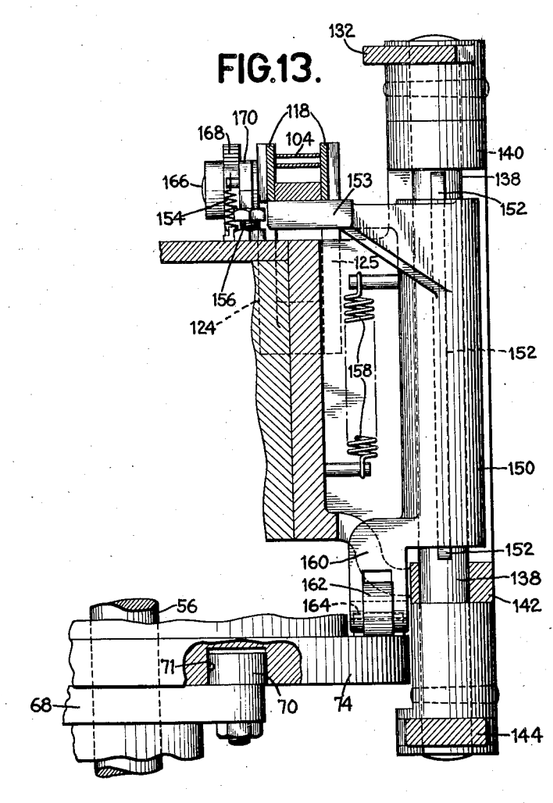
Fig. 13 is a sectional view on line 13—13 of Fig. 12.
Figures 14, 15:
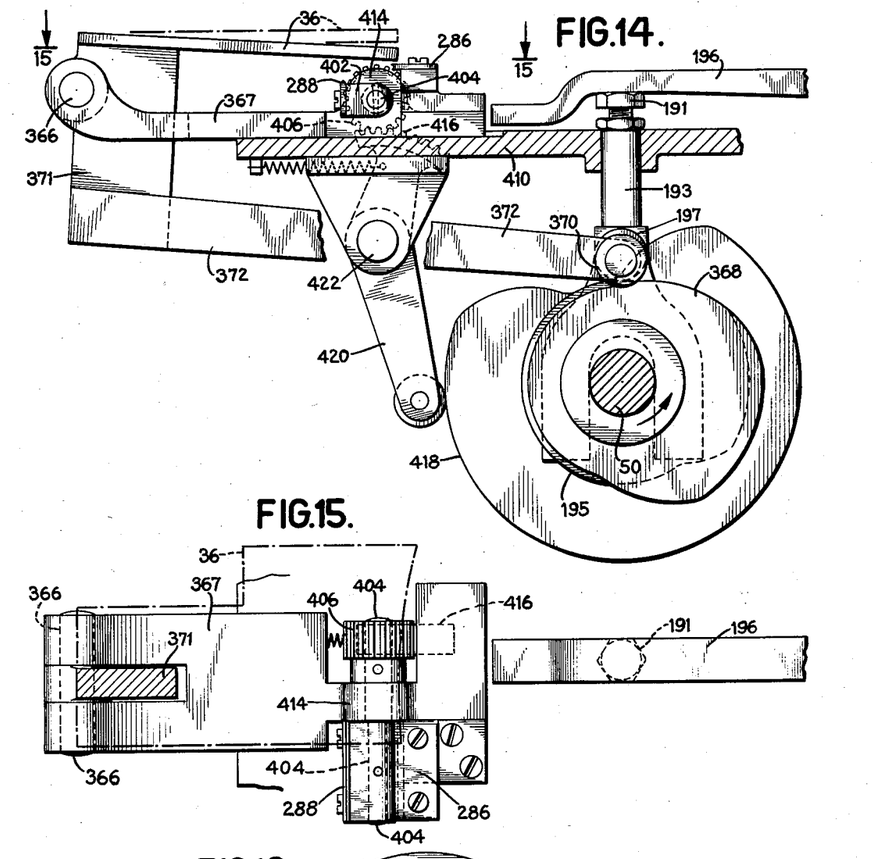
Fig. 14 is a view on line 14—14 of Figs. 6 and 9.
Fig. 15 is a view on line 15—15 of Fig. 14.

The moistening device (Figs. 1, 7, 8, 9, 12, 13 and 23) comprises an endless fabric belt 104 passing around a pulley 106 submerged in water 108 in tank 110 (Fig. 12). Pulley 106 is mounted on a pivotally mounted arm 112 forced constantly downwardly by spring 114. Integral with arm 112 is an upwardly extending finger lever 113 for convenience of the operator when changing belts, etc. Belt 104 passes upwardly and around pulley 116, through guide trough 118, around platen 120, back through trough 118 and around pulley 122 supported on arm 124 pivoted on arm 125 which is integral with the trough. Arm 124 also carries a roller 126 which is held by spring 128 against belt 104 as it passes over pulley 116, in order to insure sufficient grip between the belt and pulley 116.

While the moistening operation takes place, the band 40 is at rest with its horizontally projecting end (gummed side down) between the moist belt on platen 120, and the overhead pad 130 which is supported on arm 132. Pad 130 is adjustably supported by arm 132 on a threaded bolt 134 passing vertically through the free end of the arm, and there is a spring 136 above pad 130 to act as a cushion when the platen is thrust upwardly. An end of pad 130 is bent up to help guide the band 40 into position below the pad, as indicated by the dotted outline in Fig. 12.

Arm 132 is pinned to the upper end of vertical shaft 138, which is supported for oscillation by frame brackets 140, 142. Pinned to the lower end of shaft 138 is an arm 144 having a roller 146 held in contact with the periphery of cam plate 74 by spring 148 (Fig. 9). Mounted on shaft 138 is a sleeve 150. A feather key 152 permits vertical movement of (but prevents rotation of) the sleeve 150 relatively to shaft 138. The upper end of sleeve 150 has a bracket 153 supporting trough 118, belt 104, pulleys 116, 122, roller 126, arms 124 and 125, etc., in short, the entire assembly shown in Figs. 7 and 8, except spring 154, screw 156 and the portion of the frame into which the screw is tapped. Sleeve 150 is constantly urged downwardly by spring 158, while spring 114 in the water tank pulls the tape downwardly and keeps it taut. At the bottom of sleeve 150 is a bracket 160 in which is mounted a roller 162 which rides on the top of cam disc 74 near the edge thereof, and once each revolution of the disc the face cam 164 passes under the roller and raises sleeve 150 with its attachments. Just prior to the raising of sleeve 150 the depression in the periphery of disc 74 reaches roller 146, permitting spring 148 to oscillate shaft 138 with sleeve 150 and attachments, to bring plate 130 and platen 120 into operative position above and below the horizontally projecting end of band 40, so that while the cigar is at station B, cam 164 will raise the moist tape 104 on platen 120 into contact with the gummed under surface of the band, the parts then being in the positions shown in Figs. 1 and 23.

Before the turret described above begins to move the banding device from station B, cam 164 moves out from under roller 162 and the periphery of disc 74 actuates arm 144 to permit sleeve 150 to be lowered to normal position by spring 158 and to swing the apparatus outwardly about shaft 138 as a pivot, so as to prevent any contact between the moistening apparatus and the banding device or the cigar contained therein while the cigar is passing from station B to station C.

Fast on shaft 166 supporting pulley 116 is a ratchet wheel 168. Also fast on shaft 166 is an arm 170 bearing a ratchet pawl 172. Spring 154 holds the free end of lever 170 down against adjustable stop 156. Whenever sleeve 150 is raised to moisten a band, ratchet 168 is also raised sufficiently for pawl 172 to engage the next lower tooth on the ratchet, and while sleeve 150 is returning to its normal lowered position the ratchet and pulley 116 will be slightly rotated by stop 156, thus feeding an increment of tape 104 across platen 120 after each band is moistened.

Banding devices

As mentioned above, there are six band-applying devices radially projecting from turret 94, each being secured to the turret by a bolt 96. The design and operation of these devices may best be understood by reference to Figs. 17-24, inclusive. During the banding operation the cigar is held between a fixed lower jaw 174 and an upper jaw 176 pivoted at 178. A spring 180 attached to arm 182 which is pinned to pivot pin 178 urges upper jaw 176 constantly to closed position. Between the jaws is a horizontal pressure bar 184 supported and guided by three plunger rods 186, 188 and 190, the center one, 188, being surrounded by a compression spring 192 which urges bar 184 constantly outward. The pressure bar guides the cigar into the jaws, maintains an even pressure on the cigar, and holds the band in its proper place on the cigar while cigar and band are being placed in the jaws.

A vertical plunger 194 underneath jaw 176 serves when pushed upwardly to raise that jaw and open the gripper. While receiving the cigar into the gripper, the plunger is raised by arm 196 (Fig. 2), the arm being raised by adjustable plug 191 in the upper end of plunger 193 actuated by cam 195 on shaft 50, through roller 197 which rides on the cam (Figs. 2, 6, 9 and 14). When the cigar is to be ejected the plunger is actuated by lever 198 (Fig. 2) as will be described.

One end of bar 184 is slotted horizontally as at 200 (Fig. 19) to receive and tightly hold a folded portion of tape 202, one end of which passes upwardly over roller 204 in the end of finger 206 which is pivoted at 208 on the end of an actuator bar 210, thence around pivot pin 208 to and around roller 212 mounted on actuator 210, to be connected to tension spring 214, through which the upper tape is anchored at 216. The lower tape section passes around roller 218 in the end of finger 220, thence underneath finger 220 to tension spring 222 which is anchored at 224. One end of the finger is pivoted at 226 on the lower end of arm 228 which swings from pivot 230 and is constantly drawn rearwardly against adjustable stop 233 by spring 232 connected to the lower end of arm 234, the upper end of which is pinned to pivot 230. The free end of finger 220 has a roller 236 which is kept in contact with inclined surface 238 of lower jaw 174, by torsion spring 240 on pin 226. Torsion spring 242 on pivot pin 208 urges finger 206 in counterclockwise direction about pin 208.

Figure 21:
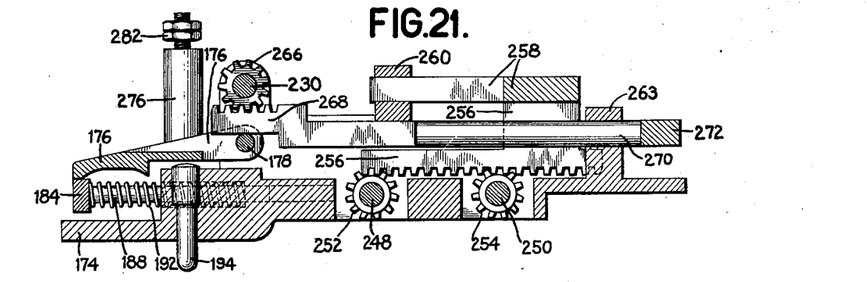
Fig. 21 is a detail view, partly in section on line 21—21 of Fig. 18.

Actuator 210 is mounted, at its end remote from the gripper, on two similar and parallel crank arms 244 and 246 fast on pins 248 and 250, respectively, and rotatable by pinions 252 and 254 respectively, which are actuated simultaneously by rack 256 (Fig. 21). The rack is attached underneath a crosshead 258 slidably mounted in guides 260 and 262 and actuated by cam 72 through the instrumentality of roller 78 mounted on top of the crosshead. Torsion spring 264, acting on crank arm 244, constantly urges actuator 210 to its home position as in Fig. 17.

Finger 220, which serves to actuate the lower section of tape 202 in order to apply the lower end of the band, is in turn actuated by pinion 266 fast on pivot pin 230, through the instrumentality of arm 228, which is also fast on pin 230. Pinion 266 is rotated by rack 268 on the end of rod 270, which passes through guide blocks 260 and 262 into a crosshead 272 which carries cam roller 80. A stub rod 274 also passes from the crosshead through guide block 262 to help keep the rack and crosshead in alignment.

Mounted on top of upper jaw 176 is a substantially vertical tube 276 containing a compression spring 278, through which passes a rod 280 having a collar 281 which enables the spring to push rod 280 downwardly. While jaw 176 is closed on a cigar (Fig. 20) the lower end of rod 280 is pushed by spring 278 against the upper side of rod 186, flattened for the purpose, thus acting as an impositive lock preventing spring 188 from exerting its full force against bar 184, which might result in prematurely forcing cigar 30 from the jaws. When jaw 176 is raised, as by plunger 194, adjusting nut 282 is engaged by the top of the tube 276 to raise rod 280 out of contact with rod 186, thus allowing spring 188 to urge the pressure bar to its outward position and restoring the banding tape to its normal position for receiving and holding the band on the next cigar to be banded.

Banding operation

The method in which the banding operation is performed may be readily understood from Figs. 22, 23 and 24. Band 40, having been held vertically in front of jaws 174, 176, as will be described, and having had its lower end crimped towards the cigar as at 284 by dies 286, 288, to be described, is pushed by the cigar into the gripper jaws, the cigar and band being then as shown in Fig. 22, tape 202 being in contact with the band. Then while the cigar is moving from station A to station B (Fig. 1) cam 74, acting on pinion 266 through rack 268, swings arm 228 to push finger 220 outwardly to cause tape 202 to wrap the lower end of the band up against the lower side of the cigar as in Fig. 23. At station B the gummed end of the band is moistened, as already described.

Figure 17:
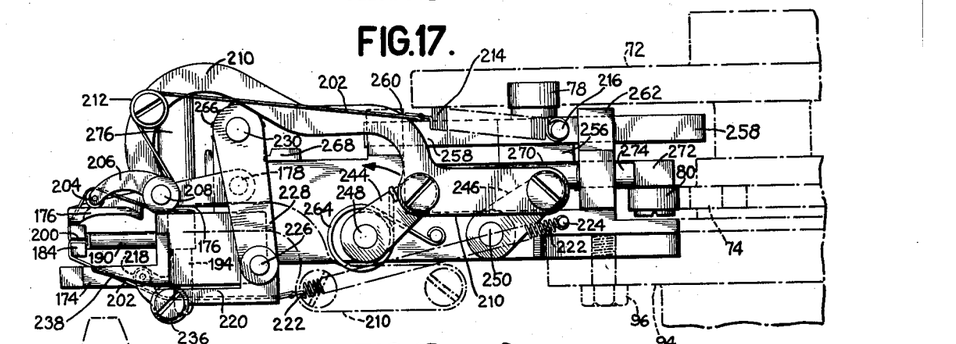
Fig. 17 is a view on line 17—17 of Fig. 1, showing an enlarged side view of one of the band-applying devices.
Figure 18:
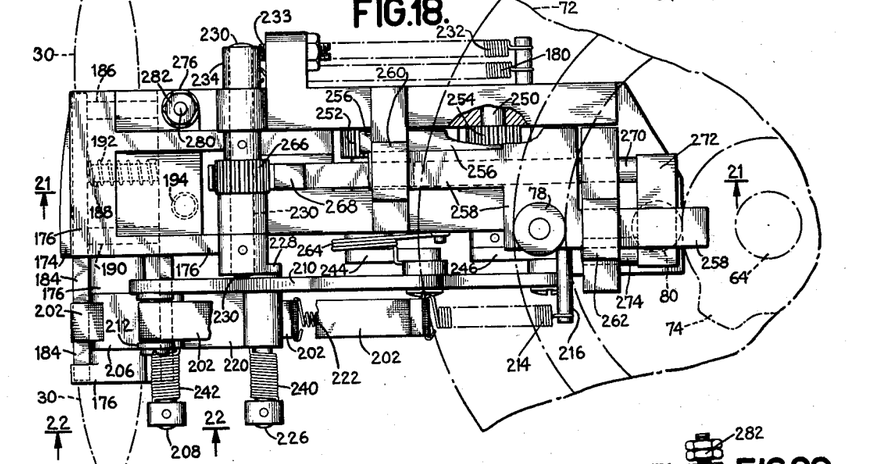
Fig. 18 is a plan view of Fig. 17.
Figure 19:
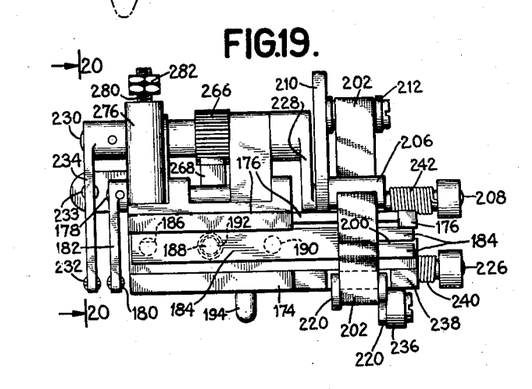
Fig. 19 is an end elevation of Fig. 17 as viewed from the left of Fig. 17.
Figure 20:
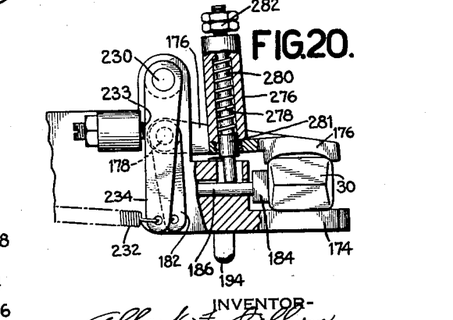
Fig. 20 is a detail view, partly in section on line 20—20 of Fig. 19.

Also at station B cam 72, acting through rack 256 on pinions 252, 254, rotates crank arms 244, 246 counterclockwise to carry actuator 210 from its full-line to broken-line positions in Fig. 17, thus causing finger 206 to actuate the tape to wrap the long end of the band around the front, and under the bottom of the cigar to overlap the short end of the band. During this operation cam 74 permits finger 220 to retreat before finger 206, so that the parts at the completion of the wrapping operation are as shown in Fig. 24. Crimp 284 in the band tends to hold the short end of the band snugly against the bottom of the cigar while the long end is overlapping the short end. The bander device is carried by the turret through station C with parts as in Fig. 24.

On arriving at station D cam 72 carries back to normal position bar 210 and parts connected therewith, and plunger 194 is actuated by arm 198 (Fig. 2) to raise jaw 176, thus permitting the banded cigar to be removed by the ejector. After plunger 194 passes out of control of lever 198, jaw 176 closes, and the bander device is carried by the turret through stations E and F with the parts as in Fig. 17. Then at station A the jaws are opened again by plunger 194, actuated by arm 196, to permit insertion of another cigar and band.

Band feeder

Figures 10, 11:
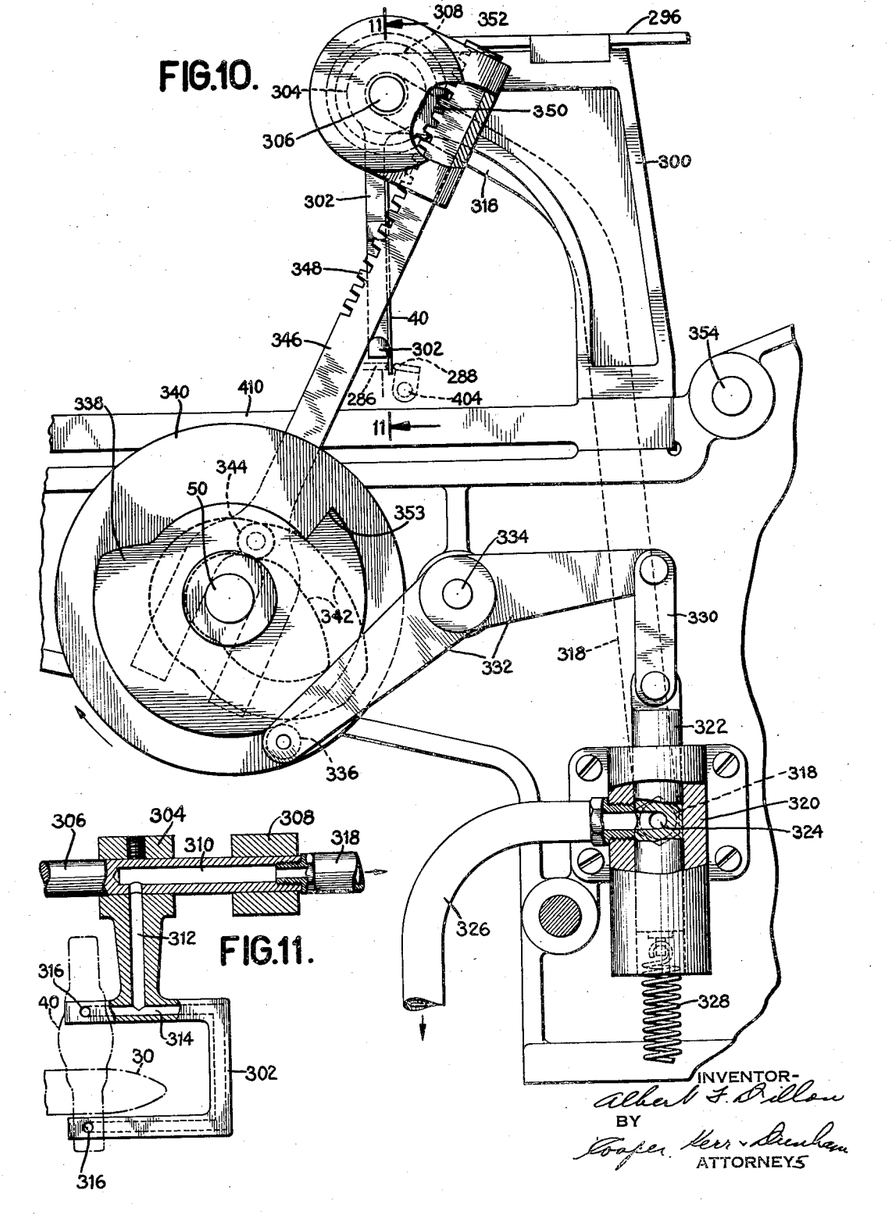
Fig. 10 is an enlarged view on line 10—10 of Fig. 1, showing the suction control features of the band feeding device.
Fig. 11 is a section on line 11—11 of Fig. 10.

As stated above, the band 40 is pushed into the bander jaws by the cigar. The mechanism for controlling the band up to that point will now be described. An elevated stack of bands (Fig. 2) rests on lips 290, and is positioned by end and side guides 292, 294, respectively, (Fig. 1). The parts just mentioned are mounted on plate 296 (Fig. 1), which is in turn adjustably secured by screws 298 on top of brackets 300. The bands are picked from the bottom of the stack one at a time by a swinging suction arm 302 and moved thereby to an upright position in front of the bander jaws. The suction arm is in the form of a U lying on its side (Fig. 11) in order to permit passage of the cigar therethrough just prior to its entry into the bander jaws. As each cigar passes through arm 302, suction on the band is relieved, thus permitting the cigar to carry the band with it to the position described above (Fig. 22). Suction arm 302 is secured by hub 304 to shaft 306 mounted for rotation in bearing blocks 308 on brackets 300. One end of the shaft is bored as at 310 to connect, through passage 312 in hub 304, with passage 314 passing through arm 302 and terminating in suction nozzles 316. Suction hose 318 connects the bored end of shaft 306 to one side of the suction control valve 320 (Figs. 9 and 10). This valve is bored vertically to receive a plunger 322, which intermediate its ends, is provided with a horizontal passage 324 which at one position of plunger travel registers with the bore of hose 318 and at the same time with the bore of hose 326, the latter being connected at one end to the side of the valve at the same height as hose 318 and at its other end to a vacuum pump (not shown). Thus at one position of plunger 322 there is free connection from the vacuum pump by way of hose 326, passage 324, hose 318 and passages 310, 312 and 314 to suction nozzles 316. Spring 328 urges plunger 322 constantly downwards. The upper end of the plunger is connected by links 330 to one end of a lever 332, fulcrumed at 334 and provided at its other end with a roller 336 on the periphery of cam 338 (Figs. 9 and 10) mounted on shaft 50. Also mounted on shaft 50 is a disc 340 having in one face a cam slot 342 containing a roller 344 mounted on bar 346 which has a rack 348 engaging a pinion 350 fast on shaft 306. As shaft 50 rotates, cam 342, acting on roller 344, moves rod 346 lengthwise of itself through guide 352, whereby rack 348 rotates pinion 350 and shaft 306 to bring suction arm 302 to its dotted-line position (Fig. 2) with its suction nozzles 316 in contact with the bottom band of the stack. At that time roller 336 is riding on the concentric part of cam 338 and the suction nozzles are in direct connection through passage 324 with the vacuum pump, therefore arm 302 has a suction grip on the bottom band in the stack. Then cam 342, acting through roller 344, rack 348 and pinion 350 rotates shaft 306 to swing arm 302 from its dotted-line horizontal position to its vertical full-line position of Fig. 2 carrying with it the bottom band 40 from the stack, which band is then held in vertical position as indicated by full lines in Figs. 2 and 10, and by broken lines in Fig. 11, right in the path of the cigar 30 about to be forced from the left (Fig. 2), (from the right in Fig. 10) into the jaws of the bander. Just as the cigar reaches the band, cam 338 has rotated to the point where roller 336 passes point 353 of the cam, whereupon spring 328 pulls plunger 322 downwards, moving passage 324 out of registry with the hose connections, thus breaking the connection between the vacuum pump and suction nozzles 316 and releasing band 40 so that it may be carried by the cigar into the bander jaws as in Fig. 22.

Cigar feeding mechanism

Figure 16:
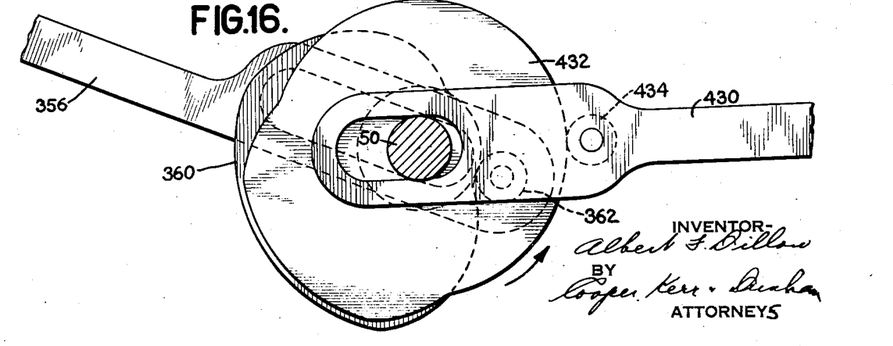
Fig. 16 is a view on line 16—16 of Fig. 9.

The cigar 30 to be banded is delivered to the broken line position at the left of Fig. 2 by apparatus which, in the present instance, is a cellophane wrapping machine. Follow-fingers 32 (Figs. 2 and 6) then push the cigar into the chairs on the upper ends of arms 34, and hold it there while arm 34 and fingers 32 swing clockwise and deposit the cigar on table 36. Fingers 32 are fast on shaft 354 which is rocked by link 356 connected to crank arm 358 on shaft 354 and is reciprocated by cam 360, on shaft 50, acting against roller 362 on link 356 (Figs. 9 and 16). Arms 34 are fast on sleeve 364, free to rotate on shaft 354 and actuated by gearing on the wrapping machine and not illustrated. After the cigar is placed on table 36, deposit fingers 38 move to the right, sliding the cigar along the table and into the bander jaws. While the turret is rotating, table 36 is held in an inclined position (Fig. 2 and full lines in Fig. 14) so that the cigar moving with the turret will not contact with the table. The table is pivoted on pin 366 supported on bracket 367, fast to part 410 of the machine frame, and is under control of cam 368 on shaft 50 through the instrumentality of roller 370 and arm 372, so as to be in alignment with lower jaw 174 of the bander while fingers 38 are pushing the cigar into the jaws. Arm 372 is connected to table 36 by vertical member 371 passing through a slot in bracket 367. Pin 366 passes horizontally through member 371. Deposit fingers 38 have horizontal extensions attached by screws 374 to carriages 376 slidable horizontally in ways 378 (Figs. 2 and 6) by cam 380 fast on shaft 50. The cam actuates the carriage by mechanism comprising roller 382 on slide bar 384, which carries rack 386 engaging pinion 388 fast to sleeve 390 rotatable on shaft 392; crank arms 394 fast to sleeve 390, and links 396 connecting the free ends of arms 394 to downwardly projecting lugs 398 on the carriages. A housing 400 attached to the frame serves to enclose pinion 388 and to guide rack bar 384.

Crimper

The device for putting crimp 284 in the ungummed end of the band may be seen in Figs. 2, 6, 14 and 15. It comprises a fixed plate 286 having a V groove in its edge, and a movable blade 288 having a V edge adapted to press the band into the groove to form the crimp. Blade 288 is secured to block 402 pinned to shaft 404 which also has fast thereon a pinion 406. The shaft with its attached parts is mounted on bracket 367. Shaft 404 oscillates in a bearing 414, integral with that bracket. Pinion 406 is rotated by an arcuate rack 416 actuated by cam 418 on shaft 50 through the instrumentality of arm 420 pivoted at 422. The crimping operation is performed while the band is in the position shown in Fig. 10.

Ejector

When the banded cigar reaches station D cradle 436 rises to receive it on two seats 438 having safety pins 440 to prevent inadvertent rearward movement of the cigar. Pad 442, cushioned by spring 444, presses upwardly against the newly applied band to keep the overlapped portions in contact in case the gum has not yet set, and overhead pads 446 are lowered onto the cigar above seats 438. These pads are cushioned by springs 448, adjustable by screw and nuts 450, 452. The cigar is then held as may best be seen in Figs. 4 and 5.

The raising of plunger 194 is effected at the proper instant by adjustable plug 424 (Figs. 2 and 6) in arm 198 of a bell crank pivoted at 426 and having a depending arm 428 actuated by link 430, which is reciprocated longitudinally of itself by cam 432 acting on roller 434 on the link (Figs. 9 and 16).

Cradle 436, seats 438 and pad 442 are all mounted on the free end of an arm 454 pivoted on shaft 456, mounted for oscillation in upstanding brackets 458, 460, forming a part of crosshead 462 mounted on rods 464, 466, slidable lengthwise of the machine through frame brackets 468, 470, 472, 474, by means of cam 476 (fast on shaft 62) through the instrumentality of arm 478 and link 480. Arm 478 is pivoted at 482 and carries cam roller 484. Link 480 is connected to the crosshead on depending bracket 486. Spring 488, attached to the end of rod 464, urges the crosshead constantly to the left (Figs. 2A and 6A) and keeps roller 484 in contact with cam 476. Mounted in brackets 458, 460, parallel to shaft 456, is another shaft 490, upon the outer ends of which are secured arms 492 which extend horizontally and then upwardly to support pads 446, as will be apparent from Figs. 2A and 3. Shafts 456 and 490 are interconnected by gear sectors 494, 496 (Figs. 2A and 6A), pinned to their respective shafts so that when one shaft rotates, the other will be forced to rotate in the opposite direction.

Arm 454 at its free end is connected by adjustable link 498 to an end of lever 500 fulcrumed at 502 and having at its other end a roller 504 riding on cam 506 fast on shaft 62. Torsion spring 508 keeps roller 504 in contact with the cam.

Figure 5:
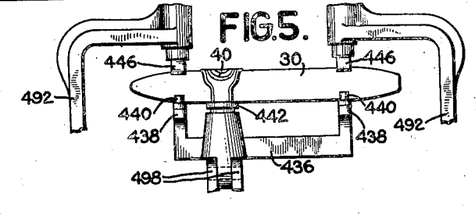
Fig. 5 is a view on line 5—5 of Fig. 4.

With the above described structure in mind it will be appreciated that when the banded cigar is about to be ejected from the bander jaws, cam 476 pushes arms 454 and 492 to the left and cam 506 rocks arm 454 about its fulcrum 456 to raise seats 438 and pad 442 into position to eject the cigar. While arm 454 is rising, arm 492, actuated by sectors 494, 496, is lowering to place pads 446 above the cigar (Figs. 4 and 5). Then the crosshead 462 is moved to the right until the cigar is deposited on delivery table 42, underneath the end of bar 512, which is rigidly, but adjustably, supported from frame bracket 513 of the machine by arm 514, rod 516 and hangers 518, at a suitable height above the table to maintain a mild pressure on the cigars as they are moved along the delivery table. Then arms 454 and 492 separate (Fig. 2A) and move again to the left to handle the next cigar.

Mounted on arm 454 are two upstanding fingers 520 (Figs. 2A, 4 and 6A), which, every time arm 454 is raised, are moved to the position indicated in Fig. 4, behind the cigar last delivered to table 42. Then when arm 454 is moved to the right, that cigar will be moved to the right on the table into contact with the cigar that preceded it, and all the cigars under bar 512 will be moved a step to the right to be finally removed by the operator. Suitable slots 522 and 524 (Fig. 1) are provided in table 42 to permit the above movements of fingers 520, 492, etc.

It is to be understood that the invention is not limited to the specific embodiment herein illustrated and described, but may be used in other ways without departure from its spirit as defined by the following claims:

I claim:

1. In apparatus of the class described, in combination, a table adapted to receive cigars to be banded, said table having a normal horizontal position and a depressed position, a banding device, means for feeding cigars from said table to said device, and means for moving said table between its normal and depressed positions, for the purpose set forth.

2. In apparatus of the class described, in combination, a table adapted to receive cigars to be banded, a banding device having gripper jaws, and means for moving said table into and out of alignment with said jaws, substantially as described.

3. In apparatus of the class described, in combination, a table adapted to receive cigars to be banded, a banding device having upper and lower gripper jaws, means for moving said table into alignment with said lower jaw to permit sliding a cigar from said table onto said lower jaw, and means for then moving said table out of alignment with said jaw for the purpose set forth.

4. In apparatus of the class described, in combination, a tiltable table adapted to receive cigars to be banded, a banding device, means for tilting said table into an operative position to permit sliding a cigar from said table into said device, and means for subsequently tilting said table to an inoperative position.

5. In apparatus of the class described, in combination, a movable table adapted to receive cigars to be banded, a plurality of banding devices, means for moving said devices one after the other to positions adjacent said table, means effective as each device reaches said adjacent position for placing said table in position to permit sliding a cigar from said table into said device, and means for shifting said table from said position after said device has received the cigar, for the purpose set forth.

6. The invention set forth in claim 5 in which said device moving means comprises a rotary turret having a plurality of banding devices mounted thereon.

7. In apparatus of the class described, in combination, a banding device having a gripper for holding a cigar, means for inserting a cigar into said gripper, means for holding a band in the path of the cigar entering said gripper, and means for releasing the band from said holding means when the cigar reaches the band, whereby the band is carried into said gripper by the cigar.

8. In apparatus of the class described, in combination, a banding device, means for inserting a cigar into said device, means for holding a band in the path of the cigar entering said device, and means for releasing the band from said holding means when the cigar reaches the band, whereby the band is carried into said device by the cigar.

9. In apparatus of the class described, in combination, a banding device, means for inserting a cigar into said device, a stack of bands, means for removing the bottom band of the stack and holding said band in the path of the cigar entering said device, and means for releasing the band from said holding means when the cigar reaches the band, whereby the band is carried into said device by the cigar.

10. The invention set forth in claim 9 in which said removing means comprises an arm having suction nozzles therein.

11. In apparatus of the class described, in combination, a banding device, means for inserting a cigar into said device, a stack of bands, an arm having suction nozzles, means for moving said arm into contact with the bottom band of said stack whereby the suction nozzles will grip said band, and means for then moving said arm to place the band in the path of the cigar entering said device.

12. The invention set forth in claim 11 in which said arm has two spaced apart suction nozzles for holding the band, and the path of the cigar passes between said nozzles when the cigar enters the banding device.

13. In apparatus of the class described, in combination, a banding device, means for inserting a cigar into said device, a stack of bands, and arm having suction nozzles, means for moving said arm into contact with the bottom band of said stack whereby the suction nozzles will grip said band, means for then moving said arm to place the band in the path of the cigar entering said device, and means for breaking the suction in said nozzles when the cigar reaches the band, whereby the band may be carried into the banding device by the cigar.

14. In apparatus of the class described, in combination, a banding device, a stack of bands, an arm having a pair of spaced-apart suction nozzles, means for swinging said arm into contact with the bottom band of the stack whereby the suction nozzles will grip said band, means for swinging said arm to hold said band in a vertical position, and means for moving a cigar between said suction nozzles against said band and into the banding device, whereby said band is carried by the cigar into the banding device.

15. In apparatus of the class described, in combination, a banding device, means for inserting into said device a cigar and a band partly surrounding the cigar and having a gummed end projecting therefrom, and a band moistener comprising a vertical shaft, a radial arm mounted on said shaft and having a pad, a sleeve slidable on said shaft and having a platen below said pad, and means for raising said sleeve on said shaft to press said platen against said pad.

16. In apparatus of the class described, in combination, a banding device, means for inserting into said device a cigar and a band partly surrounding the cigar and having a gummed end projecting therefrom; a band moistener comprising a vertical shaft, a radial arm mounted on said shaft and having a pad, a sleeve slidable on said shaft and having a platen below said pad; means for rotating said shaft to place said pad above, and said platen below, said projecting band end; and means for sliding said sleeve on said shaft to press said band between said pad and said platen.

17. The invention set forth in claim 15 in which a moistened belt passes over said platen.

18. The invention set forth in claim 16 in which a moistened belt passes over said platen.

19. The invention set forth in claim 15 in which a moistened belt passes over said platen and in which means is provided for feeding an increment of said belt across said platen after each moistening operation.

20. The invention set forth in claim 16, in which a moistening belt passes over said platen and in which means is provided for feeding an increment of said belt across said platen after each moistening operation.

21. The invention set forth in claim 15 in which an endless belt passes through a water tank and over said platen, and in which means is provided for feeding an increment of said belt across said platen after each moistening operation.

22. The invention set forth in claim 16 in which an endless belt passes through a water tank and over said platen, and in which means is provided for feeding an increment of said belt across said platen after each moistening operation.

23. The invention set forth in claim 15 in which an endless belt passes through a water tank and over said platen, and in which means is provided for feeding an increment of said belt across said platen after each moistening operation; said feeding means comprising a pulley over which said belt passes, and means for partially rotating said pulley after each moistening operation.

24. The invention set forth in claim 16 in which an endless belt passes through a water tank and over said platen, and in which means is provided for feeding an increment of said belt across said platen after each moistening operation; said feeding means comprising a pulley over which said belt passes, and means for partially rotating said pulley after each moistening operation.

25. The invention set forth in claim 15 in which an endless belt passes through a water tank and over said platen, and in which means is provided for feeding an increment of said belt across said platen after each moistening operation; said feeding means comprising a pulley over which said belt passes, and a ratchet operable after each moistening operation for partially rotating said pulley.

26. The invention set forth in claim 16 in which an endless belt passes through a water tank and over said platen, and in which means is provided for feeding an increment of said belt across said platen after each moistening operation; said feeding means comprising a pulley over which said belt passes, and a ratchet operable after each moistening operation for partially rotating said pulley.

27. In apparatus of the class described, in combination, a cigar banding device, means for inserting into said device a cigar with a band wrapped partially around the cigar with a comparatively short end of the band projecting downwardly from the rear of the cigar and a comparatively long end of the band projecting horizontally from the top of the cigar, means for bringing the short end up against the bottom of the cigar, and means for bringing the long end down over the front and across the bottom of the cigar to overlap said short end.

28. In apparatus of the class described, in combination, a cigar banding device, means for inserting into said device a cigar with a band wrapped partially around the cigar with a comparatively short end of the band projecting downwardly from the rear of the cigar and a comparatively long end of the band projecting horizontally from the top of the cigar, means for bringing the short end up against the bottom of the cigar, means for rendering adhesive the under side of said long end, means for wrapping said long end around the front and bottom of the cigar to overlap said short end, and means for holding said ends in overlapped relationship until the adhesive has set.

29. In apparatus of the class described, in combination, a cigar banding device having gripper jaws, a pressure bar between said jaws, a spring urging said bar toward normal position at the open end of said jaws, means for inserting a cigar between said jaws whereby said bar aligns the cigar as it is pushed inwardly against said spring, means for closing the jaws to hold the cigar, an impositive lock effective to restrain said bar while said jaws are closed, and means for opening said jaws whereby said bar is released from said lock and becomes effective to restore said bar to normal position after the cigar has been ejected from between said jaws.

30. In apparatus of the class described, in combination, a cigar banding device, means for inserting into said device a cigar with a band wrapped partially around the cigar with a comparatively short end of the band projecting downwardly from the rear of the cigar and a comparatively long end of the band projecting horizontally from the top of the cigar, a lower finger operable to bring the short end up against the bottom of the cigar, and an upper finger operable to wrap the long end around the front and bottom of the cigar to overlap said short end.

31. In apparatus of the class described, in combination, a cigar banding device, means for inserting into said device a cigar with a band wrapped partially around the cigar with a comparatively short end of the band projecting downwardly from the rear of the cigar and a comparatively long end of the band projecting horizontally from the top of the cigar, a band applying tape, a lower finger operable to apply a part of said tape to said band to bring the short end up against the bottom of the cigar, and an upper finger operable to apply another part of said tape to wrap the long end around the front and bottom of the cigar to overlap said short end.

32. The invention set forth in claim 31 in which springs are attached to the ends of said tape to hold said tape snugly against the ends of said fingers.

33. The invention set forth in claim 31 in which said banding device is provided with a plunger 34. In apparatus of the class described, in combination, a cigar banding device, means for inserting into said device a cigar with a band wrapped partially around the cigar with a comparatively short end of the band projecting downwardly from the rear of the cigar and a comparatively long end of the band projecting horizontally from the top of the cigar, and a lower finger operable to bring the short end up against the bottom of the cigar, said finger being pivoted on a swinging arm actuated by a cam through the instrumentality of a rack and pinion.

35. In apparatus of the class described, in combination, a cigar banding device, means for inserting into said device a cigar with a band wrapped partially around the cigar with a comparatively short end of the band projecting downwardly from the rear of the cigar and a comparatively long end of the band projecting horizontally from the top of the cigar, a lower finger operable to bring the short end up against the bottom of the cigar, and an upper finger operable to wrap the long end around the front and bottom of the cigar to overlap said short end, said upper finger being pivoted on the end of an actuator supported on similar parallel crank arms operable to move the end of the actuator over the top and down the front of the cigar, whereby said pivoted finger may fully apply the long end of the band on the under side of the cigar.

36. The invention set forth in claim 35 in which said crank arms are operable simultaneously by a cam through the instrumentality of a rack engaging a pinion on each crank.

37. In apparatus of the class described, in combination, a banding device, means for inserting a cigar into said device, means for holding a band in the path of the cigar entering said device, and means effective while the band is so held for crimping one end of said band substantially as described.

38. The invention set forth in claim 37 in which said crimping means comprises a block having a V groove on one side of the band, and a blade having a V edge adapted for pressing the band into said groove.

39. In apparatus of the class described, in combination, a device for applying a band to a cigar, means for ejecting the banded cigar from the device, a delivery table, a cradle for receiving the ejected cigar, cushioned pads for holding the cigar on said cradle, and means for moving said cradle and pads to transfer said cigar to said delivery table.

40. In apparatus of the class described, in combination, a device for applying a band to a cigar, means for ejecting the banded cigar from the device, a delivery table, a cradle for receiving the ejected cigar, cushioned pads for holding the cigar on said cradle, a cushioned pad pressing on the band, and means for moving said cradle and pads to transfer said cigar to said delivery table.

41. In apparatus of the class described, in combination, a device for applying a band to a cigar, means including a cradle for ejecting the banded cigar from the device, a delivery table, a pivoted arm supporting said cradle, means for swinging said arm about its pivot to place said cradle in position to receive the cigar from said device, means for moving said cradle to deliver said cigar to said table, a second pivoted arm, pads on said second arm, and means for swinging said second arm about its pivot to place said pads on said cigar on said cradle.

42. In apparatus of the class described, in combination, a device for applying a band to a cigar, means including a cradle for ejecting the banded cigar from the device, a delivery table, a pivoted arm supporting said cradle, means for swinging said arm about its pivot to place said cradle in position to receive the cigar from said device, means for moving said cradle to deliver said cigar to said table, a second pivoted arm, pads on said second arm, means for swinging said second arm about its pivot to place said pads on said cigar on said cradle, and means for moving said cradle and pads to deliver said cigar to said table.

43. In apparatus of the class described, in combination, a device for applying a band to a cigar, means including a cradle for ejecting the banded cigar from the device, a delivery table, a pivoted arm supporting said cradle, means for swinging said arm about its pivot to place said cradle in position to receive the cigar from said device, a second pivoted arm, pads on said second arm, and means gearing said second arm to said first arm whereby said second arm will approach the cigar from above while said first arm approaches it from below.

44. In apparatus of the class described, in combination, a device for applying a band to a cigar with the ends of the band overlapping, means for ejecting the banded cigar from the device, a delivery table, means for transferring the ejected cigar to said delivery table, and means for applying pressure to the overlapped band ends while the transferring operation is occurring.

45. In apparatus of the class described, in combination, a device for applying a band to a cigar, means for ejecting the banded cigar from the device, a delivery table, a cross-head, means supporting said cross-head for sliding motion, upper and lower arms pivoted on said cross-head, means for sliding said cross-head toward and away from said banding device, a cradle on the lower of said arms, a cushioned pad on the upper of said arms, and means effective when said cross-head is moved toward said device for placing said cradle to receive the cigar and for placing said pad to hold said cigar on said cradle.

46. The invention set forth in claim 45 in which said cradle has provisions for applying pressure to the overlapping ends of the band.

47. In apparatus of the class described, in combination, a device for applying a band to a cigar, means including a cradle for ejecting the banded cigar from the device, a delivery table, means for placing said cradle to receive the cigar from said device, a delivery table, means for moving said cradle to transfer said cigar to said table, a follow finger, and means effective while said cradle is being placed, for locating said finger behind the previously transferred cigar whereby said finger pushes said previous cigar along said table while the cigar on said cradle is being transferred thereto.

48. In apparatus of the class described, in combination, a device for applying a band to a cigar, means for ejecting the banded cigar from the device, a delivery table, a pivoted arm, a follow finger on said arm, means for swinging said arm to place said follow finger behind the cigar previously placed on said table, and means for bodily moving said arm and said finger to move said previous cigar along said table.

49. In apparatus of the class described, in combination, a device for applying a band to a cigar, means for ejecting the banded cigar from the device, a delivery table, a cross-head, means for supporting said cross-head for sliding motion, an arm pivoted on said cross-head, a follow finger on said arm, means for moving said cross-head and said arm to place said finger behind the cigar previously transferred to said table, and means effective while said finger is behind said cigar for sliding said cross-head to cause said finger to move said previous cigar along said table.

50. In apparatus of the class described, in combination, a banding device, means for inserting into said device a cigar and a band partly surrounding the cigar and having a gummed end projecting therefrom, a band moistener comprising a pad above and a moistened member below said band end, and means for bringing said pad and said member together to press said band end between them to moisten the gummed portion thereof, said moistener having an operative and an inoperative position, means for moving said moistener between said positions and means for moving the band to and from said operative position simultaneously with the movements of said moistener.

ALBERT FLEMMING DILLON.